United States Patent [19]

Griffiths et al.

[11] Patent Number: 5,663,473
[45] Date of Patent: Sep. 2, 1997

[54] HYDROCARBON CONVERSION PROCESS

[75] Inventors: David C. Griffiths, Esher; Keith W. Palmer, Weybridge; Ian A B Reid, Southfields, all of England

[73] Assignee: BP Chemicals Limited, London, England

[21] Appl. No.: 481,623

[22] Filed: Jun. 7, 1995

[30]  Foreign Application Priority Data

Oct. 28, 1994 [GB] United Kingdom ............... 94 21734

[51] Int. Cl.$^6$ ............................................. C07C 4/02
[52] U.S. Cl. .................... 585/652; 585/654; 585/658; 585/950; 208/48 R; 134/2; 134/20; 134/39
[58] Field of Search ......................... 585/652, 658, 585/950, 654; 208/48 R; 134/2, 20, 39

[56]  References Cited

U.S. PATENT DOCUMENTS

| 3,170,863 | 2/1965 | Spillane et al. | 585/652 |
|---|---|---|---|
| 3,297,777 | 1/1967 | Granton et al. | 585/652 |
| 3,399,245 | 8/1968 | Knapp | 585/652 |
| 3,433,731 | 3/1969 | Oliver | 208/48 R |
| 3,499,055 | 3/1970 | Freund et al. | 585/652 |
| 3,507,929 | 4/1970 | Happel et al. | 134/2 |
| 3,541,179 | 11/1970 | Okagami et al. | 585/652 |
| 3,641,190 | 2/1972 | Kivlen et al. | 585/950 |
| 4,051,193 | 9/1977 | Kurtz et al. | 585/658 |
| 4,454,022 | 6/1984 | Shoji et al. | 585/950 |
| 4,917,787 | 4/1990 | Fukuhara et al. | 585/950 |
| 4,940,826 | 7/1990 | Font Freide et al. | 585/654 |
| 5,105,052 | 4/1992 | Font Freide et al. | 585/652 |
| 5,382,741 | 1/1995 | Astbury et al. | 585/652 |

FOREIGN PATENT DOCUMENTS 1153531  5/1969  United Kingdom ............... 585/950

*Primary Examiner*—Glenn A. Caldarola
*Assistant Examiner*—Walter D. Griffin
*Attorney, Agent, or Firm*—Nixon & Vanderhye

[57]  ABSTRACT

A process for the conversion of a liquid paraffin-containing hydrocarbon which comprises the steps of (a) partially combusting a mixture of the liquid hydrocarbon and a molecular oxygen-containing gas in a reaction chamber with a catalyst capable of supporting combustion beyond the normal fuel rich limit of flammability. The mixture has a stoichiometric ratio of hydrocarbon to oxygen of greater than the stoichiometric ratio required for complete combustion to carbon dioxide and water. The process produces a product stream and a carbon deposit in the reaction chamber. Periodically, the liquid hydrocarbon and molecular oxygen-containing gas mixture in step (a) is replaced with a fuel-rich carbon containing gas stream for a period of time sufficient to effect substantial removal of the carbon deposit from the reaction chamber.

17 Claims, No Drawings

HYDROCARBON CONVERSION PROCESS

The present invention relates to a process for the conversion of hydrocarbons with an on-line step for the removal of carbon deposits.

BACKGROUND OF THE INVENTION

A problem associate with hydrocarbon conversion processes, especially catalytic processes, at elevated temperatures is the deposition of carbon in the reactor. Carbon deposition or coking can result on the reactor walls and/or on the surface of the catalyst. Coke deposition on reactor walls reduces heat transfer, can result in an increase in pressure drop and ultimately a decrease in overall reaction efficiency. Similarly, carbon deposition on catalysts reduces efficiency resulting in decreased conversion and/or selectivity.

Carbon deposition on catalysts and on reactor walls is generally a greater problem during processing of heavier hydrocarbon feeds. The relative involatility of the molecules makes condensation in catalyst pores or on reactor walls more likely and, once condensed, coke forming reactions such as polymerisation and dehydrogenation are accelerated. Residue-containing feedstocks, in particular, have a high tendency towards carbon deposition. Again, this is due to both physical and chemical effects. Feeds containing vacuum residue will normally consist of some very large molecules called asphaltenes which can boil at up to 1000° C. The involatility of such molecules accelerates coking. In addition, the residues contain relatively large amounts of aromatic molecules. These are low in hydrogen/carbon ratio and can act as nucleation sites for coking via polymerisation reactions.

When carbon deposition reaches intolerable levels, the process must be stopped and the carbon removed. Typically, carbon removal or decoking is carried out by gasification in the presence of steam or by burning in the presence of air or a combination of both. In each case external heat is required. Alternatively, high pressure water jets may be used to remove the carbon layers from the walls of the reactor. Once the carbon has been removed, the process may be re-started. The obvious disadvantage with this method of treatment is the time lost in stopping and re-starting the process.

U.S. Pat. No. 4,917,787 discloses a method intended to overcome the aforementioned problems through the development of on-line decoking wherein the cracking process is periodically stopped and the hydrocarbon feed replaced with a steam-containing feed for a period of time sufficient to reduce the carbon deposits. The hydrocarbon feed is turned off whilst maintaining a methane-hydrogen/oxygen feed to a burner. Additional stem is added to the reactor and the decoking is carried out by the action of steam at temperatures in excess of 1200° C. which gasifies the carbon in the pyrolysis region of the reactor.

DESCRIPTION OF THE INVENTION

We have now found that on-line decoking can be incorporated into hydrocarbon conversion processes wherein the decoking agent is a mixture of a fuel gas and an oxygen-containing gas.

According to the present invention, there is provided a process for the conversion of a liquid paraffin-containing hydrocarbon which comprises the steps of:
(a) partially combusting a mixture of the liquid hydrocarbon and a molecular oxygen-containing gas in a reaction chamber with a catalyst capable of supporting combustion beyond the normal fuel rich limit of flammability, the mixture having a stoichiometric ratio of hydrocarbon to oxygen of greater than the stoichiometric ratio required for complete combustion to carbon dioxide and water, to produce a product stream and a carbon deposit in the reaction chamber;
(b) periodically replacing the liquid hydrocarbon and molecular oxygen-containing gas mixture in step (a) with a fuel-rich carbon-containing gas stream for a period of time sufficient to effect substantial removal of the carbon deposit from the reaction chamber.

For the purposes of the present invention, a fuel-rich carbon-containing gas is defined as a mixture of a gaseous carbon-containing fuel and an oxygen-containing gas wherein the ratio of fuel to oxygen is from 2.5 to 13.5 times the stoichiometric ratio required for complete combustion.

The process of the present invention provides the advantage that there is no need to stop the process in order to carry out a separate decoking process which can be labour intensive and result in decreased productivity of a given unit. A further advantage of the present process is that, unlike conventional decoking procedures, the present procedure requires only one set of downstream equipment since the decoke products are compatible with the main product stream. Furthermore, by appropriate choice of fuel, at least some of the gaseous fuel can be converted to the desired product. The resulting yield of product may, therefore, be maintained and enhanced during the decoking step.

The use of the fuel-rich feed as a decoking agent is surprising since by definition the mixture contains insufficient oxygen to combust the fuel itself. Indeed it may be expected that coking may be increased further by the introduction of an additional source of carbon to the reaction chamber under fuel-rich conditions.

The process of the present invention is for the conversion of a liquid paraffin-containing hydrocarbon feed, particularly heavy paraffinic hydrocarbons. Suitable processes include the production of olefins from a paraffin-containing feed, the production of synthesis gas from a paraffin-containing feed, or mixtures of synthesis gas and olefins. The nature of the product will be dependent upon the reaction conditions.

The hydrocarbon feed is a liquid hydrocarbon comprising one or more paraffins. Suitable liquid paraffin-containing hydrocarbons include naphtha, gas oil, vacuum gas oil, refinery residues, atmospheric residues, vacuum residues, mixtures of liquid hydrocarbons as found in crude or fuel oils or mixtures thereof. Additional feed components may be included with the hydrocarbon feed, if so desired. In particular, methane, ethane, propane, butane and mixtures thereof may be fed with the liquid hydrocarbon feed into the reaction chamber. Additional gases such as carbon dioxide, hydrogen, nitrogen, carbon monoxide or steam may also be co-fed into the feed stream.

The liquid hydrocarbon feed may be passed directly into the reactor in the liquid state or where possible may be vapourised prior to entering the reaction chamber. Where the hydrocarbon is passed directly into the reactor, the liquid hydrocarbon is introduced into the reaction chamber as a spray of droplets such that partial vaporisation and homogeneous mixing may result. Any suitable means for providing a spray of liquid may be used. Suitably, the liquid hydrocarbon feed may pass through a nozzle.

The liquid hydrocarbon and the oxygen-containing gas are mixed to provide a stoichiometric ratio of hydrocarbon to oxygen which is greater than the stoichiometric ratio required for complete combustion to carbon dioxide and water. The hydrocarbon and oxygen-containing gas may be mixed before being passed into the reaction chamber. Alternatively, the two feeds may be passed in separately and mixed prior to contacting the catalyst. The liquid hydrocarbon and the oxygen-containing gas may be preheated prior to contact with the catalyst.

The molecular oxygen-containing gas may suitably be air, oxygen or an air/oxygen mixture. Preferably, the gas is oxygen. The molecular oxygen-containing gas may be diluted with an inert gas such as nitrogen, helium or argon.

The products of the hydrocarbon conversion process will be dependent upon the reaction conditions. Where the process is for the production of olefins, the paraffin-containing hydrocarbon may be mixed with the oxygen-containing gas in a stoichiometric ratio of hydrocarbon to oxygen of suitably 5 to 13.5 times the stoichiometric ratio for complete combustion to carbon dioxide and water. Preferably, the ratio is from 5 to 9 times the stoichiometric ratio for complete combustion to carbon dioxide and water.

The liquid hydrocarbon feed and oxygen-containing gas are contacted with a catalyst which is capable of supporting combustion. The principle role of the catalyst is to stabilise partial combustion of the gaseous mixture which may not otherwise be flammable.

Suitably, the catalyst is a supported Group VIII metal. The Group VIII metals are iron, cobalt, nickel, ruthenium, rhodium, palladium, osmium, iridium and platinum. Preferably, the metal is selected from platinum or palladium or a mixture thereof. Suitably, the catalyst comprises from 0.1 to 1%, preferably 0.25 to 0.5 wt % of metal. There is a wide range of support materials available, all of which are well known to the person skilled in the art. The preferred support for the catalyst used in the process of the present invention is alumina. The support material may be in the form of spheres or other granular shapes. The support may also be in the form of a thin layer or wash coat on another substrate. The substrate may be a substantially continuous multi-channel ceramic structure such as a foam or a regular channelled monolith. The preferred wash coat/substrate combination is a gamma alumina coated lithium aluminium silicate foam.

The catalyst may be prepared by loading the support with a mixture of platinum and/or palladium by conventional methods well known to those skilled in the art. The resulting compound is then heat treated to 1200° C. before use in the process of the present invention. Optionally, the compound may be reduced prior to the use as a catalyst.

The hydrocarbon feed and the oxygen-containing gas may be introduced into the reaction chamber under a gas hourly space velocity of suitably greater than 10,000 hour$^{-1}$, preferably, the gas hourly space velocity is greater than 20,000 hour$^{-1}$, most preferably greater than 100,000 hour$^{-1}$. It will of course be understood that the optimum gas hourly space velocity will depend upon the feed and the pressure. For the purposes of the present invention, gas hourly space velocity is defined as:

$$GHSV = \frac{\text{volume of total feed at } NTP}{\text{Time} \times \text{volume of catalyst bed}} \ h^{-1}$$

The process may be suitably carried out at a temperature of from 600° to 1200° C., preferably from 700° to 1100° C., most preferably from 750° to 1050° C.

Where the process of the present invention is for the production of synthesis gas, the paraffin-containing feed may be mixed with the oxygen-containing gas in a stoichiometric ratio of hydrocarbon to oxygen of suitably 1.1 to 5 times the stoichiometric ratio for complete combustion to carbon dioxide and water. Preferably, the ratio is from 2 to 4, most preferably from 2.8 to 3.5 times the stoichiometric ratio for complete combustion to carbon dioxide and water.

The hydrocarbon feed and oxygen-containing gas is contacted with a catalyst suitable for the production of synthesis gas. Such a catalyst will have steam reforming activity. The catalyst may be a platinum group metal on a suitable support material. It is preferred that the catalyst is platinum, rhodium, palladium, nickel or mixtures thereof. The support material may suitably be a refractory material e.g. calcium aluminate, alumina or alumina silicate.

The hydrocarbon feed and oxygen-containing gas may be introduced into the reaction chamber under a gas hourly space velocity of from 10,000 to 100,000 hour$^{-1}$.

The process for producing synthesis gas may be carried out at a temperature of from 850° to 1200° C., preferably from 1000° to 1100° C., especially 1050° to 1090° C.

The process of the present invention provides an on-line method for removing undesired carbon deposits from the reaction chamber, especially carbon deposited on the catalyst. The de-coking step is achieved by replacing the hydrocarbon feed and the oxygen-containing gas with a fuel-rich carbon-containing gas. It will of course be understood that withdrawal of the hydrocarbon feed and introduction of the fuel-rich gas stream will be carried out in a manner such that reaction conditions, especially temperature, is maintained preferably above 750° C. The fuel-rich gas comprises a gaseous carbon-containing fuel and an oxygen-containing gas. Suitably, the gaseous fuel is selected from methane, ethane, propane, butane, carbon monoxide, or mixtures thereof. Optionally, hydrogen may be co-fed with the fuel. The oxygen-containing gas may be air, oxygen or a mixture thereof, optionally diluted with an inert gas such as nitrogen. It is preferred that the oxygen-containing gas is oxygen. The gaseous carbon-containing fuel and the oxygen-containing gas are suitably mixed in a ratio of from 2.5 to 13.5 times, preferably from 5 to 9 times the stoichiometric ratio for complete combustion. This stoichiometric ratio will, of course, be dependent upon the choice of gaseous fuel.

The decoking step is carried out periodically during the hydrocarbon conversion process. The decoking step may be initiated when the level of coke has built up to a sufficient level to cause processing problems. Several process indicators may be used to monitor the degree of coking. Typically, an increase in pressure drop across the reactor and/or catalyst, a change in temperature profile across the reactor/catalyst and a change in product yield pattern may be indicative of a substantial build up of the carbon level. It will of course be understood that the frequency of the decoking and the duration of the de-coking step, will depend upon the nature of the hydrocarbon feed and, thus, the extent of carbon deposition. Suitably, the de-coking step is carried out for a period of from 5 minutes to several hours, preferably less than 1 hour.

The fuel-rich gas stream may be introduced into the reaction chamber under a gas hourly space velocity of suitably greater than 10,000 hour$^{-1}$, preferably greater than 20,000 hour$^{-1}$, most preferably greater than 100,000 hour$^{-1}$.

The decoking step of the process of the present invention is suitably carried out at temperature of from 500° C. to 1500° C., preferably from 550° C. to 1250° C., especially, 600° to 1000° C. In order to maintain this temperature, it may be necessary to adjust the stoichiometry of the decoking gas mixture during the decoking step The hydrocarbon conversion process of the present invention, including the decoking step, may be carried out under atmospheric pressure or elevated pressure. Where it is desired to use elevated pressure, for example greater than 5 bar absolute, the process may be carried out at a pressure of up to 50 bar absolute, preferably 40 bar absolute, most preferably 30 bar absolute.

Where the process is carried out under elevated pressure, the reaction products may be quenched as they emerge from the reaction chamber to avoid further reactions taking place. The quenching step is particularly suitable to the production of olefins. The reaction product is quenched within 50 milliseconds from formation. Where the product is synthesis gas, reaction residence time will be greater than 50 milliseconds prior to quenching. It will of course be understood that the time required between product formation and the act of quenching will depend upon the reaction conditions e.g. temperature and pressure.

The products may be quenched using rapid heat exchangers of the type familiar in steam cracking technology. Either in addition to, or instead of the indirect heat exchangers, a direct quench may be employed. Suitable quenching fluids include water and hydrocarbons such as ethane or naphtha. At the aforementioned temperature and pressure, some of the hydrocarbon quenching fluid may be cracked to provide additional olefin products in the effluent stream. Such hydrocarbon quenching fluids are referred to as reactive quenching fluids.

The amount of quenching fluid and choice of fluid which may be usefully employed will depend upon the temperature of the product stream. Optionally, a second quenching fluid such as water may be employed if a hydrocarbon fluid is utilised in the process.

The process may be carried out in any suitable reactor e.g. fixed bed, fluid bed or spouted bed reactors. It is preferred to carry out the process in a fixed bed reactor.

The process of the present invention may be carried out in a single reactor. Alternatively, the process may employ a plurality of reactors operating in parallel and exiting into a common cooling and separation equipment. The number of reactors may be chosen such that one reactor is being decoked whilst the other(s) is carrying out the hydrocarbon conversion. Suitably, the process utilises at least two reactors, preferably three, especially four.

Where the hydrocarbon conversion process is directed to the production of olefins, the products of the process of the present invention are predominantly ethene, propene, butenes, and pentenes. In addition to these products, carbon monoxide, aromatic hydrocarbons, methane, acetylene, water, hydrogen and carbon dioxide may be produced. Where the hydrocarbon conversion process is directed to the production of synthesis gas, the predominant products are, of course, carbon monoxide and hydrogen. Small amounts of carbon dioxide, water and methane may also be obtained. The desired products are preferably removed from the reaction chamber rapidly by a high gas flow.

EXAMPLES

The invention will now be described in more detail by way of the following examples.

Example 1

Preparation of Ceramic Foam Catalyst for Olefin Production

The lithium aluminium silicate foam support was obtained precoated with gamma alumina from Morgan Matroc plc with a porosity of 30 ppi. The foam was washed with a platinum/palladium solution of tetraamine metal chloride salts, drawn through the support by vacuum, dried and finally calcined at 1200° C. for 12 hours. The impregnation of the foam was controlled by monitoring the volume of solution absorbed by the foam to give a loading of 0.25 wt % in the final catalyst. The heat treated catalyst was re-impregnated with the platinum/palladium solution and heated in air at 200° C.

Example 2

Conversion of Medium Fuel Oil/Ethane to Olefins

The Pt/Pd loaded ceramic foam catalyst (approximately 28 mm diameter by 30 mm length) was placed in a quartz-lined cylindrical metal reactor (approximately 30 mm diameter by 130 mm length). The top face of the catalyst was positioned 20 mm from the tip of a twin-fluid gas atomising nozzle and the region between the nozzle and the catalyst face was coned to match the angle of the spray. The reactor was lagged with insulation to minimise heat loss to the surroundings and thermocouples were positioned at several points in the reactor. The bottom of the reactor section was connected to equipment for condensing out liquid products and allowing analysis of the gaseous effluent.

Ethane (3.08 g/min), hydrogen (0.09 g/min) and nitrogen (1.5 g/min) were passed through a preheater and into the reactor at atmospheric pressure until a catalyst temperature of 90° C. was achieved. Addition of a small flow of oxygen caused immediate temperature rise on the catalyst and flows were adjusted to values of ethane 3.72 g/min), oxygen (1.80 g/min), nitrogen (1.53 g/min) and hydrogen (0 g/min) which produced a catalyst temperature of 800° C. Nitrogen is added as an internal standard for subsequent analysis by gas chromatography and is not required for operation of the process of the current invention. A typical product analysis under these conditions is shown in Table 1, column 1. It should be noted that at this stage the system has not reached thermal equilibrium and the data in column 1 reflect a significant heat drain on the reaction. The data also show no coke recovery indicating that no significant carbon deposition is occuring in the reactor.

After a short period to allow stabilisation, the ethane flow was reduced to 2.42 g/min and medium fuel oil (4.93 g/min) as defined in Table 2 was introduced through the atomising nozzle. Oxygen was increased to 2.99 g/min to maintain catalyst temperature above 800° C. Products obtained under these conditions are shown in Table 1, column 2. Under the conditions of this experiment catalyst coking was observed over a period of 40 minutes. This was characterised by a decrease in catalyst temperatures and an increase in the reactor temperature downstream of the catalyst.

The decoking procedure was initiated by reducing the medium fuel oil flow to zero and adjusting the ethane and oxygen to 3.72 and 1.81 g/min respectively. Analysis of the gaseous effluent during this period (Table 1, column 3) indicates decoking is occurring by the presence of an increased level of carbon dioxide in the product, and by the mass balance which measures more carbon in the reactor products than is present in ethane feed. After a "decoking" period of 30 minutes, catalyst temperatures and carbon dioxide levels have returned to normal for ethane/oxygen feeds.

The medium fuel oil was re-admitted at 5 g/min and gas flows adjusted to levels similar to that prior to the decoking (ethane 2.26 g/min, oxygen 2.99 g/min). Catalyst temperature was greater than 800° C. Product analysis is shown in Table 1, column 4 and shows that the yields are very similar to that of column 2 before the decoking step was carried out.

Using this decoking procedure the experiment was continued for in excess of 20 cycles.

TABLE 1

FEED, CONDITIONS AND PRODUCTS FOR EXAMPLE 2

| | 1<br>Start-up | 2<br>Oil operation | 3<br>Decoke | 4<br>Oil operation |
|---|---|---|---|---|
| Feed Flow-rate (g/Min) | | | | |
| Fuel Oil | 0.00 | 4.93 | 0.00 | 5.10 |
| Oxygen | 1.80 | 2.99 | 1.81 | 2.99 |
| Ethane | 3.72 | 2.42 | 3.72 | 2.26 |
| Nitrogen | 1.53 | 1.53 | 1.53 | 1.53 |
| Product Flow-rates (g/min) | | | | |
| $H_2$ | 0.02 | 0.13 | 0.05 | 0.10 |
| $O_2$ | 0.05 | 0.06 | 0.05 | 0.07 |
| $N_2$ | 1.53 | 1.53 | 1.53 | 1.53 |
| $CH_4$ | 0.04 | 0.64 | 0.11 | 0.44 |
| CO | 0.75 | 2.31 | 0.59 | 1.97 |
| $CO_2$ | 0.40 | 0.74 | 0.59 | 0.88 |
| $C_2H_4$ | 0.58 | 1.34 | 1.30 | 1.36 |
| $C_2H_6$ | 2.52 | 0.35 | 2.01 | 0.52 |
| $C_2H_2$ | 0.00 | 0.18 | 0.01 | 0.11 |
| $C_3H_6$ | 0.00 | 0.19 | 0.03 | 0.17 |
| $C_3H_8$ | 0.00 | 0.02 | 0.02 | 0.02 |
| C4 | 0.00 | 0.18 | 0.03 | 0.14 |
| $C_5/C_6$ | 0.00 | 0.16 | 0.00 | 0.13 |
| Benzene | 0.00 | 0.16 | 0.01 | 0.05 |
| Toluene | 0.00 | 0.04 | 0.01 | 0.01 |
| Other liquid hydrocarbons | 0.00 | 2.41 | 0.00 | 2.99 |
| $H_2O$ | 1.15 | 1.20 | 1.12 | 1.29 |
| Coke* | 0.00 | +0.23 | −0.40 | +0.10 |

*based on mass balance calculation;
+equals coke formed;
−equals coke consumed.

TABLE 2

CHARACTERISTICS OF MEDIUM FUEL OIL

| Composition | Carbon | 87.5 wt % |
|---|---|---|
| | Hydrogen | 11.2 wt % |
| | Sulphur | 1.14 wt % |
| | Nitrogen | 4500 ppm |
| | Ni + V | 39 ppm |
| Density | 0.96 kgl$^{-1}$ at 15° C. | |
| Viscosity | 197 centistokes at 50° C. | |

We claim:

1. A process for the conversion of a liquid paraffin-containing hydrocarbon which comprises the steps of:
   (a) partially combusting a mixture of a liquid paraffin-containing hydrocarbon and a molecular oxygen-containing gas in a reaction chamber with a catalyst capable of supporting combustion beyond the normal fuel rich limit of flammability, the mixture having a stoichiometric ratio of hydrocarbon to oxygen of greater than the stoichiometric ratio required for complete combustion to carbon dioxide and water, to produce a product stream and a carbon deposit in the reaction chamber; and
   (b) periodically replacing the liquid hydrocarbon and molecular oxygen-containing gas mixture in step (a) with a fuel-rich carbon containing gas stream for a period of time sufficient to effect substantial removal of the carbon deposit from the reaction chamber.

2. A process as claimed in claim 1 in which the liquid paraffin-containing hydrocarbon is selected from the group consisting of naphtha, gas oil, vacuum gas oil, refinery residues, atmospheric residues, vacuum residues, mixtures of liquid hydrocarbons as found in crude or fuel oils and mixtures thereof.

3. A process as claimed in claim 1 in which the fuel-rich carbon-containing gas stream comprises a gaseous carbon-containing fuel and an oxygen-containing gas in a stoichiometric ratio of from 2.5 to 13.5 times the stoichiometric ratio for complete combustion.

4. A process as claimed in claim 3 in which the gaseous carbon-containing fuel is selected from the group consisting of methane, ethane, propane, butane, carbon monoxide, and mixtures thereof.

5. A process as claimed in claim 1 in which the fuel rich gas stream is introduced into the reaction chamber under a gas hourly space velocity of greater than 10,000 hour$^{-1}$.

6. A process as claimed in claim 1 in which the product stream comprises an olefinic hydrocarbon.

7. A process as claimed in claim 1 in which the catalyst is a supported Group VIII metal.

8. A process as claimed in claim 7 in which the catalyst comprises from 0.1 to 1 wt % Group VIII metal.

9. A process as claimed in claim 1 in which the catalyst is platinum or palladium supported on gamma alumina coated lithium aluminium silicate foam.

10. A process as claimed in claim 1 in which the stoichiometric ratio of hydrocarbon to oxygen is from 5 to 13.5 times the stoichiometric ratio for complete combustion to carbon dioxide and water.

11. A process as claimed in claim 1 in which the liquid hydrocarbon/molecular oxygen-containing gas mixture is introduced into the reaction chamber under a gas hourly space velocity of greater than 10,000 hour$^{-1}$.

12. A process as claimed in claim 1 in which the product stream comprises synthesis gas.

13. A process as claimed in claim 12 in which the catalyst is a platinum group metal supported on a refractory material.

14. A process as claimed in claim 12 in which the stoichiometric ratio of hydrocarbon to oxygen is from 1.1 to 5 times the stoichiometric ratio for complete combustion to carbon dioxide and water.

15. A process as claimed in claim 12 in which the liquid hydrocarbon/molecular oxygen-containing gas mixture is introduced into the reaction chamber under a gas hourly velocity of from 10,000 to 100,000 hour$^{-1}$.

16. A process as claimed in claim 12 in which the fuel-rich carbon containing gas stream is introduced into the reaction chamber under a gas hourly space velocity of greater than 10,000 hour$^{-1}$.

17. A process as claimed in claim 12, in which the fuel-rich carbon containing gas stream is introduced into the reaction chamber under a gas hourly space velocity of from 10,000 to 100,000 hour$^{-1}$.

* * * * *